(12) United States Patent
Montocchio et al.

(10) Patent No.: US 8,708,072 B2
(45) Date of Patent: Apr. 29, 2014

(54) MODULATED VEHICLE RETARDATION SYSTEM AND METHOD

(75) Inventors: Joseph M. Denis Montocchio, Dubuque, IA (US); David F. Rindfleisch, Asbury, IA (US); John M. Chesterman, Dubuque, IN (US)

(73) Assignee: Deere and Company, Moline, IL (US)

( * ) Notice: Subject to any disclaimer, the term of this patent is extended or adjusted under 35 U.S.C. 154(b) by 304 days.

(21) Appl. No.: 13/028,114

(22) Filed: Feb. 15, 2011

(65) Prior Publication Data
US 2012/0205169 A1    Aug. 16, 2012

(51) Int. Cl.
*B60W 20/00*    (2006.01)
(52) U.S. Cl.
USPC ............... 180/65.275; 180/165; 180/65.4; 477/118; 477/121; 701/70
(58) Field of Classification Search
USPC .......... 180/165, 54.1, 65.4, 65.275; 701/70, 701/93; 477/118, 121, 139, 140
See application file for complete search history.

(56) References Cited

U.S. PATENT DOCUMENTS

| | | | |
|---|---|---|---|
| 3,397,727 A * | 8/1968 | Orosz ........................... | 411/105 |
| 3,931,870 A | 1/1976 | Memmer | |
| 3,946,973 A | 3/1976 | Budway et al. | |
| 4,324,320 A | 4/1982 | Spurlin et al. | |
| 4,349,233 A | 9/1982 | Bullard et al. | |
| 4,477,124 A | 10/1984 | Watanabe | |
| 4,485,444 A | 11/1984 | Maruyama et al. | |
| 4,631,778 A | 12/1986 | Kocon et al. | |
| 4,662,511 A | 5/1987 | Greener | |
| 4,809,836 A | 3/1989 | Zilber | |
| 4,828,079 A | 5/1989 | Fujinami | |
| 4,846,316 A | 7/1989 | Fujinami | |
| 5,045,739 A | 9/1991 | Kuwahara | |
| 5,247,378 A | 9/1993 | Miller | |
| 5,303,986 A | 4/1994 | VanDeMotter et al. | |
| 5,613,744 A * | 3/1997 | Eslinger et al. ............... | 303/191 |
| 5,618,084 A | 4/1997 | Reiner | |
| 5,685,619 A | 11/1997 | Brown | |
| 5,855,534 A * | 1/1999 | Bates ............................ | 477/120 |
| 5,941,614 A | 8/1999 | Gallery et al. | |
| 6,092,595 A | 7/2000 | Fecht et al. | |
| 6,273,571 B1 | 8/2001 | Sharp et al. | |
| 6,299,263 B1 | 10/2001 | Uematsu et al. | |
| 6,641,662 B2 | 11/2003 | Radojevic et al. | |
| 6,695,416 B1 | 2/2004 | Reiner | |
| 7,046,133 B2 | 5/2006 | Weast et al. | |
| 7,225,059 B2 | 5/2007 | Kettenacker et al. | |
| 7,249,810 B2 | 7/2007 | Grupp et al. | |
| 7,477,348 B2 | 1/2009 | Watanabe | |
| 7,672,771 B2 | 3/2010 | Nakanishi et al. | |
| 7,739,021 B2 | 6/2010 | Wegeng et al. | |
| 7,869,927 B2 * | 1/2011 | Uematsu ......................... | 701/70 |
| 2009/0071777 A1 | 3/2009 | Weber et al. | |
| 2012/0205169 A1 * | 8/2012 | Montocchio et al. .......... | 180/54.1 |

FOREIGN PATENT DOCUMENTS

EP    1418101 A1    5/2004

* cited by examiner

*Primary Examiner* — John Walters
*Assistant Examiner* — James Triggs
(74) *Attorney, Agent, or Firm* — Faegre Baker Daniels LLP

(57) ABSTRACT

An articulated vehicle is provided having a cab portion, a trailer portion, and a coupling assembly positioned between the cab portion and the trailer portion. A front wheel assembly may support the cab portion, and a rear wheel assembly may support the trailer portion. The vehicle may include a modulated retarder system configured to slow the vehicle when descending a slope.

28 Claims, 5 Drawing Sheets

MODULATED VEHICLE RETARDATION SYSTEM AND METHOD

FIELD

The present disclosure relates to a vehicle retarder system, and more particularly to a system and method for automatic retarder modulation of a work vehicle.

BACKGROUND AND SUMMARY

Articulated vehicles, such as articulated dump trucks (ADT's), are known in the art. For example, ADT's typically include a cab portion having a first frame supporting an operator cab, and a trailer portion having a second frame supporting a bin. The bin may be configured to contain a load and is typically coupled to an actuator for angular movement relative to the second frame. The first frame and the second frame may be operably coupled through an articulation joint. A front wheel assembly coupled to the first frame may provide rolling support to the cab portion, and a rear wheel assembly coupled to the second frame may provide rolling support to the trailer portion.

Articulated vehicles may include one or more retarders configured to assist with slowing down the vehicle during a descent. These retarders may serve to reduce wearing and overheating of the vehicle brakes, for example. Some retarders may include a manual adjustment to allow an operator to adjust the strength of the retarder based on the operating conditions of the vehicle.

According to an embodiment of the present disclosure, a vehicle is provided including a chassis, a front wheel assembly configured to support the chassis, and a rear wheel assembly configured to support the chassis. A drive train includes an engine, a transmission coupled to the engine, and a drive shaft coupled to the front and rear wheel assemblies. The transmission is configured to shift between a first gear and a second gear. A retarder is configured to apply a braking force to the drive train. A controller in communication with the retarder and the transmission is configured to automatically adjust a gain of the retarder during a shift of the transmission between the first gear and the second gear.

According to another embodiment of the present disclosure, a vehicle is provided including a chassis, a front wheel assembly configured to support the chassis, and a rear wheel assembly configured to support the chassis. A drive train includes an engine, a transmission coupled to the engine, and a drive shaft. The transmission is configured to shift between a plurality of gears. A retarder is configured to apply a braking force to the drive train. A sensor is configured to detect a load condition of the vehicle. A controller in communication with the retarder and the transmission is configured to detect a shift condition of the transmission. The controller is further configured to adjust a strength of the retarder upon detection of the shift condition of the transmission and based on the detected load condition of the vehicle.

According to yet another embodiment of the present disclosure, a vehicle is provided including a chassis and a drive train. The drive train includes an engine, a transmission coupled to the engine, and a drive shaft. The transmission is configured to shift between a plurality of gears. A retarder is coupled to the drive train and is configured to apply a braking force to the drive train. The vehicle includes a modulation means for shifting the transmission between the plurality of gears. The vehicle further includes a detection means for detecting a shifting condition of the transmission. The vehicle further includes an adjustment means for adjusting a strength of the retarder upon detection of the shifting condition with the detection means. In one embodiment, the retarder is configured to apply the braking force to at least one of the engine, the transmission, and the drive shaft.

BRIEF DESCRIPTION OF THE DRAWINGS

The above-mentioned and other features and advantages of the invention, and the manner of attaining them, will become more apparent and the disclosure itself will be better understood by reference to the following description taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention in any manner.

DETAILED DESCRIPTION

The embodiments disclosed herein are not intended to be exhaustive or to limit the disclosure to the precise forms disclosed in the following detailed description. Rather, the embodiments are chosen and described so that others skilled in the art may utilize their teachings.

Figure 1:
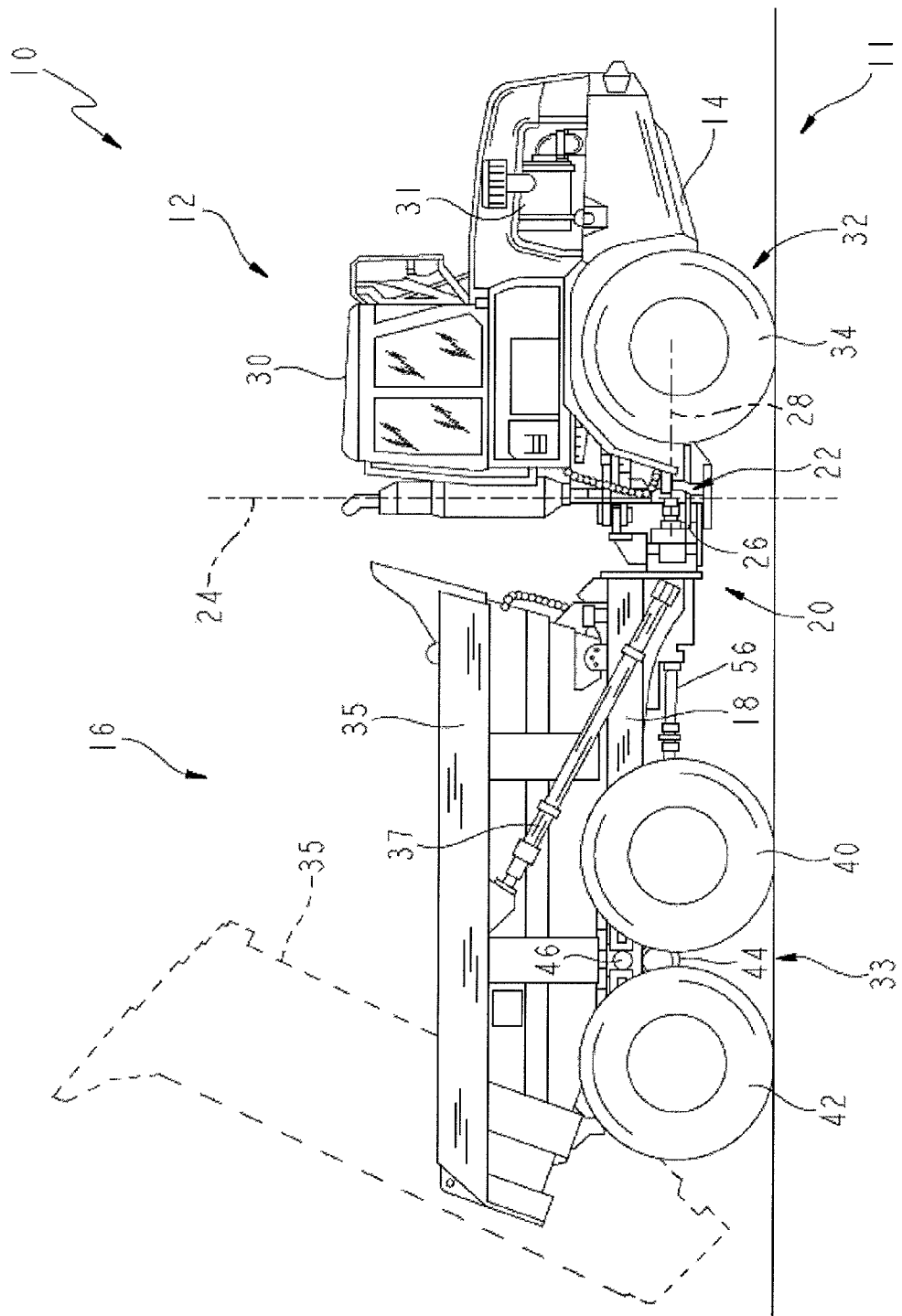
FIG. 1 illustrates an exemplary articulated vehicle incorporating the modulated retarder system of the present disclosure.

Referring initially to FIG. 1, an exemplary articulated vehicle 10 includes a chassis 11 having a first or cab portion 12 and a second or trailer portion 16. Cab portion 12 includes a first frame 14, and trailer portion 16 includes a second frame 18. First frame 14 is connected to second frame 18 through a coupling assembly 20. In the illustrated embodiment, coupling assembly 20 includes a pivot frame coupling 22 and a rotational frame coupling 26. Pivot frame coupling 22 provides for articulated movement, or pivoting, of second frame 18 relative to first frame 14 about a vertical axis 24. Rotational frame coupling 26 provides for rotational movement of second frame 18 relative to first frame 14 about a longitudinal axis 28. In one embodiment, vehicle 10 includes one or more hydraulic actuators configured to control the angle between first and second frames 14, 18 for steering vehicle 10.

First frame 14 illustratively supports an operator's cab 30 and an engine 31 for propelling vehicle 10. A first or front wheel assembly 32 supports cab portion 12 and is operably coupled to first frame 14. First wheel assembly 32 includes a pair of wheels 34 for providing rolling support to cab portion 12. A dump body or bin 35 for containing a load is supported by second frame 18. An actuator, such as a hydraulic cylinder 37, may be coupled to bin 35 for angularly elevating bin 35 relative to second frame 18 (as shown in phantom in FIG. 1).

Figure 2:
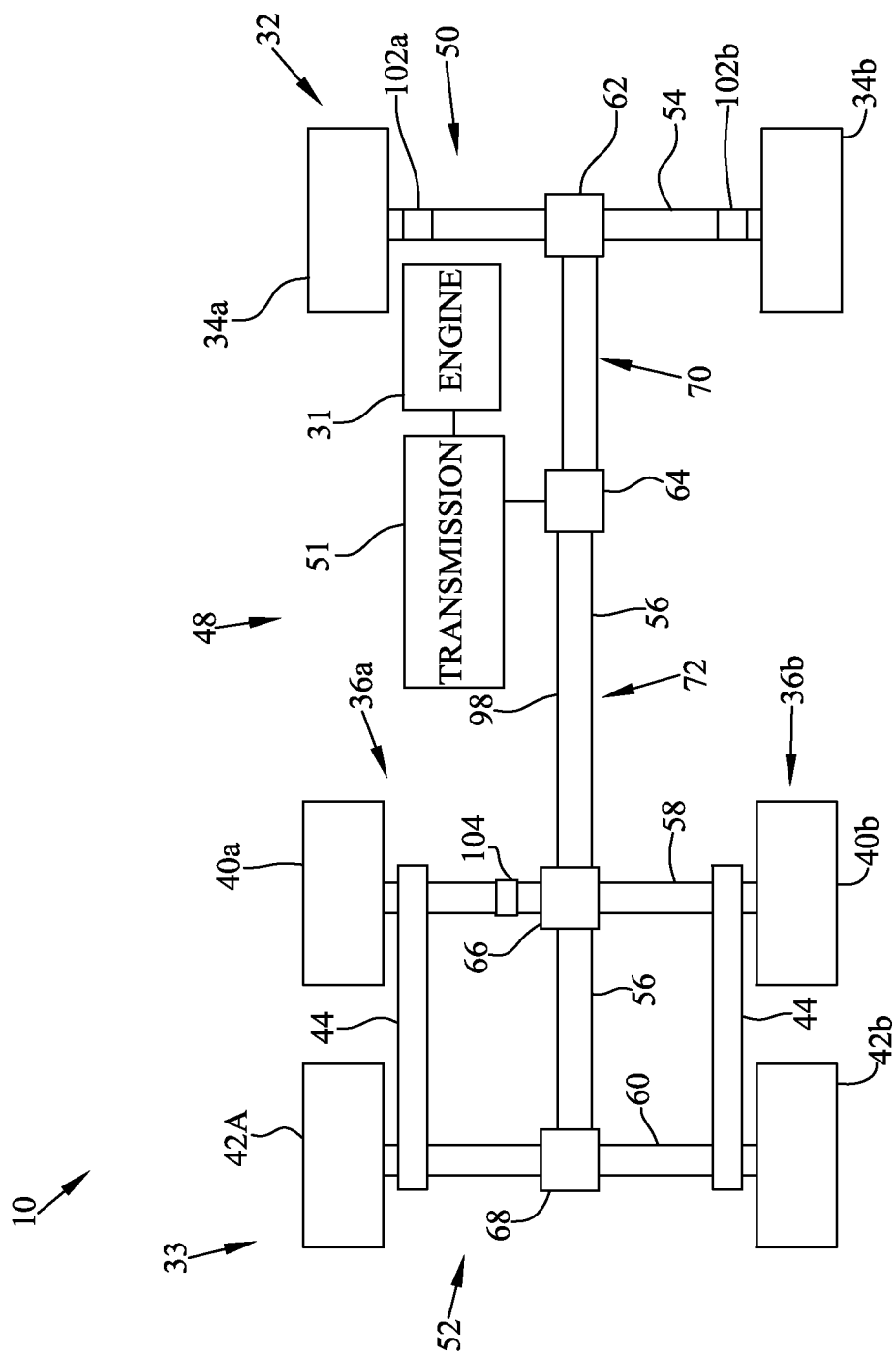
FIG. 2 illustrates a top schematic view of an exemplary drive train of the articulated vehicle of FIG. 1 with a front wheel assembly and a rear wheel assembly.

A second or rear wheel assembly 33 is operably coupled to second frame 18 for supporting trailer portion 16. In the illustrated embodiment, rear wheel assembly 33 includes front wheels 40 and rear wheels 42. Referring to FIG. 2, rear wheel assembly 33 illustratively includes a left rear wheel assembly 36a and a right rear wheel assembly 36b. Left and right rear wheel assemblies 36a, 36b each illustratively include a front wheel 40a, 40b and a rear wheel 42a, 42b, respectively. In the illustrated embodiment, each of front wheels 40a, 40b and rear wheels 42a, 42b are rotatably coupled to a tandem or walking beam 44 (see also FIG. 5). As illustrated in FIG. 1, tandem 44 is pivotally coupled to second frame 18 through a pivot tandem coupling 46. Operation of tandem 44 facilitates pivoting movement of front wheel 40 relative to rear wheel 42 about coupling 46, thereby facilitating continuous ground engagement by wheels 40 and 42. In the illustrated embodiment, coupling 46 consists of a rigid shaft that extends from second frame 18 to tandem 44 to provide the pivoting therebetween. In one embodiment, other than rotation, shaft 46 has a fixed position relative to second frame 18 such that shaft 46 moves vertically, longitudinally, and laterally with second frame 18.

In the illustrated embodiment, front and rear wheels 40 and 42 are at a fixed distance from shaft 46. As a result, the vertical location of the axis of rotation of front and rear wheels 40 and 42 relative to second frame 18 is independent of the load carried by bin 35. In the illustrated embodiment, because rigid shaft 46 is directly coupled to second frame 18 and tandem 44, the spring constant between second frame 18 and tandem 44 is large so that there is substantially no body roll between second frame 18 and tandem 44.

Vehicle 10 may include alternative wheel assembly configurations. For example, fewer or more wheels and/or axles may support trailer portion 16 and/or cab portion 12.

Referring to FIG. 2, an exemplary drive train 48 of vehicle 10 is illustrated. Engine 31 is coupled to a drive shaft 56 via a transmission 51 for driving front and rear wheel assemblies 32, 33. In the illustrative embodiment, transmission 51 is an automatic transmission controlled and modulated by a transmission controller 116 (see FIG. 3), although other types of transmissions may be provided. Front wheel assembly 32 includes a front axle assembly 50, and rear wheel assembly 33 includes a bogie or rear axle assembly 52. Front axle assembly 50 illustratively includes a front axle 54 coupled between wheels 34a, 34b and a differential 62 coupled to front axle 54. Bogie axle assembly 52 includes a first rear axle 58 coupled between wheels 40a, 40b and a second rear axle 60 coupled between wheels 42a, 42b. In the illustrated embodiment, first axle 58 includes a first differential 66 and second axle 60 includes a second differential 68. Tandems 44 of left and right rear wheel assemblies 36a, 36b are further included in bogie axle assembly 52 and coupled to first and second axles 58, 60.

Front brakes 102a, 102b are coupled to front axle 54 for applying a braking force to front axle 54. Fewer or additional front brakes 102 may be coupled to front axle assembly 50. A rear brake 104 is illustratively coupled to first axle 58 for applying a braking force to both rear axles 58, 60. In particular, a rear brake 104 coupled to first rear axle 58 may apply braking torque to second rear axle 60 through drive shaft 56. Alternatively, fewer or additional rear brakes 104 may be coupled to bogie axle assembly 52 for braking first and second axles 58, 60. For example, additional rear brakes 104 may be coupled to first axle 58, and one or more rear brakes 104 may be coupled to second axle 60. In one embodiment, brakes 102, 104 are hydraulically-actuated disc brakes, although brakes 102, 104 may be other suitable types.

Drive shaft 56 is coupled to front axle 54 of front axle assembly 50 and to first and second axles 58, 60 of bogie axle assembly 52. Drive shaft 56 is configured to provide torque from transmission 51 and engine 31 to front axle 54 and first and second axles 58, 60 for propelling vehicle 10. In particular, differential 62 of front axle 54 is coupled to drive shaft 56 and is configured to provide torque from drive shaft 56 to each wheel 34a, 34b while allowing wheels 34a, 34b to rotate at different speeds. Similarly, differentials 66, 68 of respective axles 58, 60 are coupled to drive shaft 56 and are configured to provide torque from drive shaft 56 to respective wheels 40, 42 while allowing individual wheels 40, 42 to rotate at different speeds.

In the illustrated embodiment, drive shaft 56 includes an inter-axle differential 64 configured to allow axles 58, 60 to rotate at different speeds than front axle 54 during operation of vehicle 10. As illustrated in FIG. 2, drive shaft 56 includes a first portion 70 coupled between front axle assembly 50 and differential 64 and a second portion 72 coupled between differential 64 and bogie axle assembly 52. Front axle 54 is coupled to first portion 70, and first and second axles 58, 60 are coupled to second portion 72. Differential 64 serves to allow first portion 70 and second portion 72 of drive shaft 56 to rotate at different speeds during operation of vehicle 10, thereby allowing front axle 54 to rotate at different speeds than first and second axles 58, 60. In the illustrated embodiment, transmission 51 is coupled to differential 64 for driving drive shaft 56. In one embodiment, transmission 51 and differential 64 are provided in a single assembly, and an output shaft 98 of transmission 51 forms a part of second portion 72 of drive shaft 56. Alternative configurations of coupling transmission 51 to drive shaft 56 may be provided.

Differential 64 may include a differential lock, such as a clutch, for selectively locking differential 64. When differential 64 is locked, first portion 70 of drive shaft 56 is locked to second portion 72 to rotate therewith.

Figure 3:
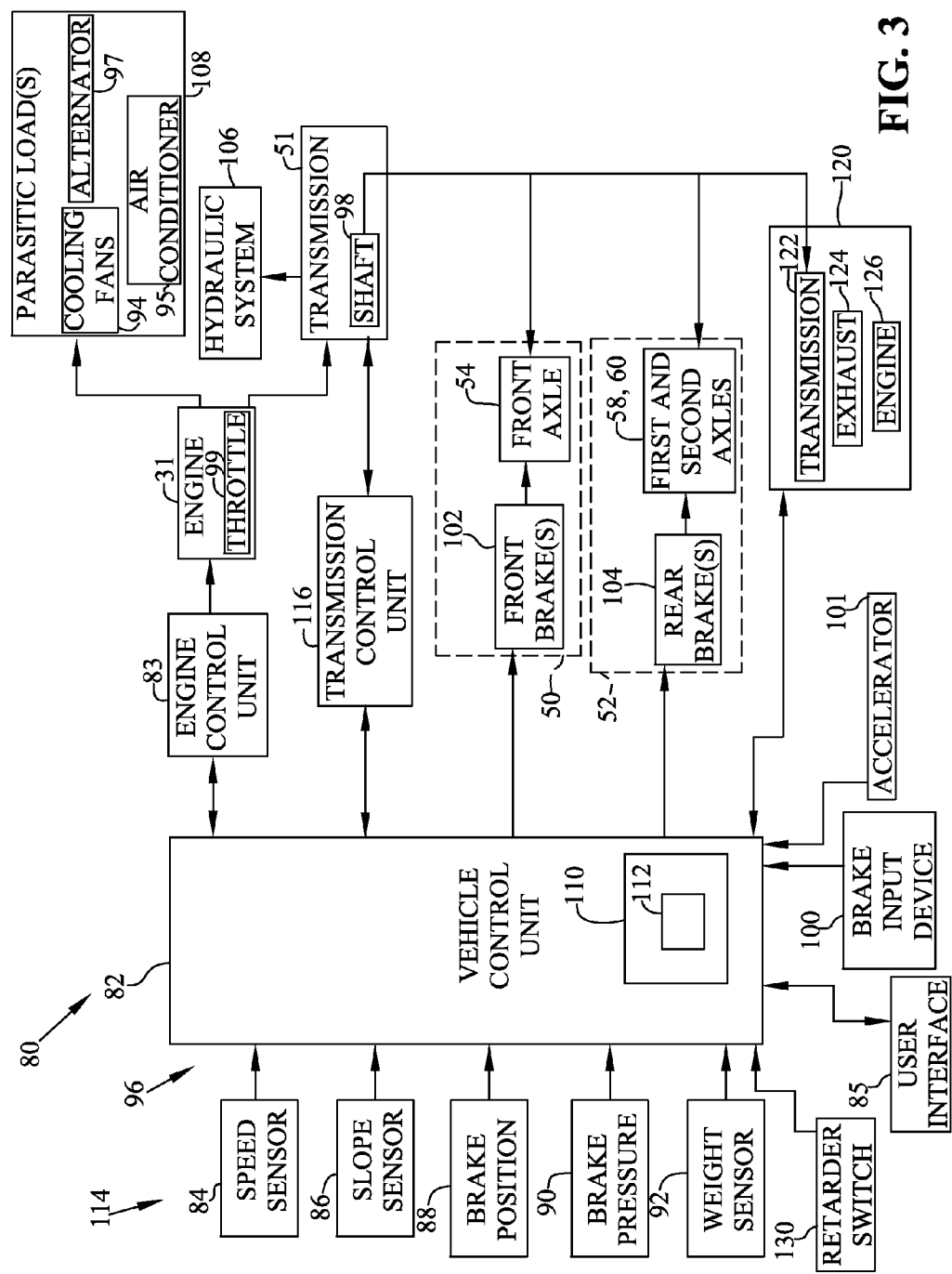
FIG. 3 illustrates a representative view of an exemplary braking system of the vehicle of FIG. 1.

Referring to FIG. 3, an exemplary braking system 80 of vehicle 10 is illustrated. In the illustrated embodiment, braking system 80 is configured to automatically control and modulate one or more speed retarders 120 based on various inputs 96. Braking system 80 may also be configured to provide overspeed protection to vehicle 10. Vehicle 10 may approach an overspeed condition when the components of drive train 48, including engine 31, transmission 51, and drive shaft 56, for example, reach speeds that meet or exceed design limits.

Vehicle 10 illustratively includes a vehicle or chassis controller 82 configured to control devices and systems of vehicle 10 and an engine controller 83 configured to control engine 31. Vehicle 10 illustratively also includes transmission controller 116 for controlling and modulating transmission 51. In the illustrated embodiment, vehicle controller 82 is configured to control speed retarders 120 based on various inputs and vehicle parameters. Controller 82 is also configured to control brakes 102, 104 based on input from a brake input device 100 and other control inputs. Vehicle controller 82 may also communicate with engine controller 83 for controlling engine 31 and with transmission controller 116 for controlling transmission 51. For example, vehicle controller 82 provides a throttle command to controller 83 for controlling the position of a throttle plate 99 of engine 31 based on input from an accelerator 101. In one embodiment, brake input device 100 and accelerator 101 each include a pedal or lever, but may include other suitable input devices. Controller 82 may also control the operation of differentials 62, 64, 66, 68 illustrated in FIG. 2. In the illustrated embodiment, vehicle controller 82 includes a processor 110 having memory 112 containing software configured to analyze inputs from various vehicle sensors for controlling vehicle devices and systems. Although FIG. 3 illustrates three controllers 82, 83, 116 for controlling the systems and devices of vehicle 10, fewer or additional controllers may also be used.

As illustrated in FIG. 3, a user interface 85 may be provided for the operator to access vehicle controller 82 and/or engine controller 83, for example, to modify settings or to enter instructions. User interface 85 may be of conventional design, such as a keypad or control panel, and may be positioned within cab 30. User interface 85 may include a display for providing an operator with vehicle information, such as vehicle speed, diagnostics, differential feedback, sensor information, or other vehicle parameters.

Engine 31 is illustratively configured to provide power to several systems or loads of vehicle 10. In addition to providing power to transmission 51, engine 31 illustratively is also configured to provide power to a hydraulic system 106 and to one or more parasitic loads 108. In the illustrated embodiment, hydraulic system 106 is coupled to transmission 51 and powered by engine 31 through transmission 51, although other configurations of hydraulic system 106 may be used. Hydraulic system 106 may include, for example, hydraulic cylinder 37 (see FIG. 1) for moving bin 35 relative to second frame 18. In one embodiment, hydraulic system 106 further includes one or more hydraulic actuators for controlling the angle between first and second frames 14, 18 for steering vehicle 10. In one embodiment, hydraulic system may also drive a cooling and/or lubrication system of transmission 51.

Parasitic loads 108 illustratively include one or more cooling fans 94 and an air conditioner compressor 95. Cooling fans 94 are configured to cool engine 31 or other drivetrain components. In one embodiment, two cooling fans 94 are used to cool engine 31. Parasitic loads 108 may also include an alternator 97 that uses engine power for generating electrical energy used to charge vehicle batteries and run electrical accessories. When parasitic loads 108 draw power from engine 31, the engine power available for transmission 51 and/or hydraulic system 106 may be reduced.

In the illustrated embodiment, controller 82 is configured to control braking system 80 based on inputs 96 from vehicle sensors 114. Inputs 96 may include the load condition of vehicle 10, the slope of the ground, the speed of vehicle 10, the transmission gear, the position of brake input device 100, and/or the applied brake pressure. Fewer or additional inputs 96 may be provided for braking system 80. In the illustrated embodiment, sensors 114 include a speed sensor 84, a slope sensor 86, a brake position sensor 88, a brake pressure sensor 90, and one or more weight sensors 92 in communication with controller 82. Weight sensor 92 may be configured to detect the payload contained in bin 35 and/or the weight of vehicle 10. Further, transmission control unit 116 may provide the transmission gear or speed to controller 82.

Speed sensor 84 is configured to measure the speed of vehicle 10 and provide a signal to vehicle controller 82 representative of the measured speed. Speed sensor 84 may be coupled to output shaft 98, engine 31, drive shaft 56, one or more axles 54, 58, 60, and/or one or more wheels 34, 40, 42 for detecting the speed of vehicle 10. In the illustrated embodiment, speed sensor 84 measures the rotational speed of transmission output shaft 98. Speed sensor 84 may alternatively measure wheel speed and/or engine speed of vehicle 10. In one embodiment, transmission controller 116 receives speed feedback provided with speed sensor 84 and provides the detected speed to vehicle controller 82. Speed sensor 84 may comprise any suitable sensor for detecting speed. The speed of vehicle 10 may also be detected with a global positioning system (GPS) signal and/or a ground detection radar or laser.

Slope sensor 86 is configured to measure the slope or grade of the ground under vehicle 10 (i.e., the inclination angle of vehicle 10) and provide a signal representative of the measured ground slope to vehicle controller 82. Slope sensor 86 may comprise a conventional inclinometer or another suitable slope angle sensor. Brake position sensor 88 is configured to provide a signal to vehicle controller 82 representative of the position of brake input device 100. For example, brake position sensor 88 may include a conventional potentiometer coupled to a foot pedal or lever of brake input device 100 to measure the travel distance or position of brake input device 100. Other suitable brake position sensors 88 may also be used. Brake pressure sensor 90 is configured to measure the brake pressure applied by front brakes 102 and/or rear brakes 104 and to provide a signal or signals representative of the measured brake pressures to vehicle controller 82.

One or more weight sensors 92 are configured to measure the load condition of vehicle 10. In particular, weight sensors 92 may be used to determine the weight of a load contained in bin 35 (see FIG. 1) of vehicle 10. In one embodiment, a weight sensor 92 is coupled to each of left and right rear wheel assemblies 36a, 36b for independently measuring the weight supported by each rear wheel assembly 36a, 36b and providing signals indicative of the measured weights to controller 82. Based on the measured weights on wheel assemblies 36a, 36b, controller 82 may determine the load condition of vehicle 10.

Figure 5:
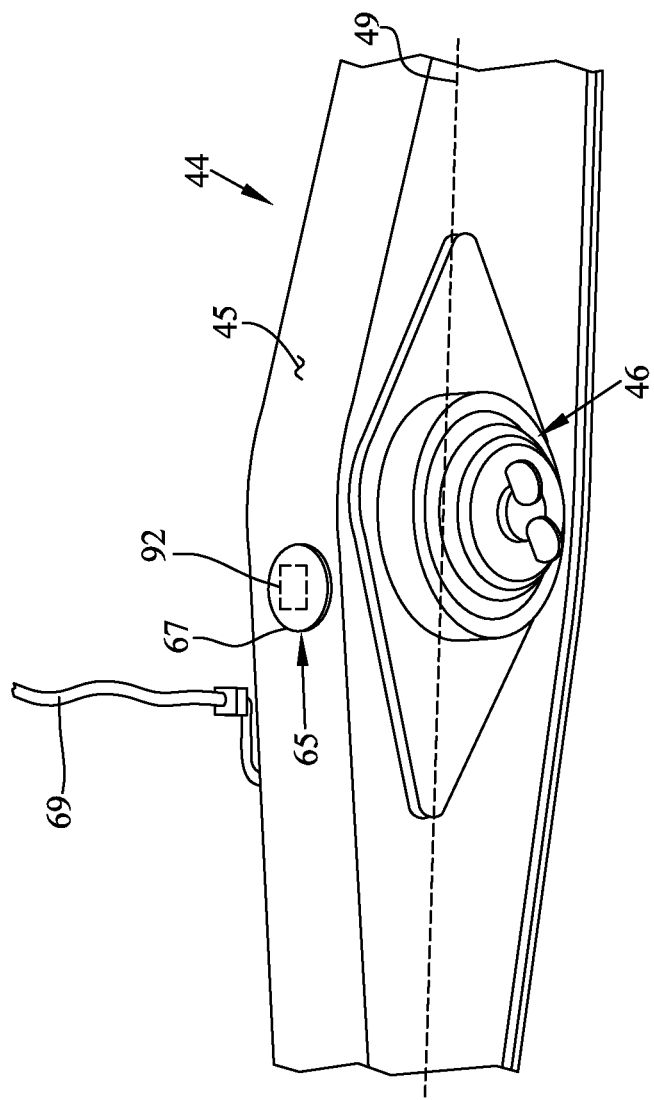
FIG. 5 illustrates an exemplary walking beam of the vehicle of FIG. 1 including a weight sensor.

In one embodiment, each weight sensor 92 includes a strain gauge mounted to a structure of rear wheel assembly 33, such as walking beam 44, for example, for detecting the weight of vehicle 10. See, for example, weight sensor 92 mounted to walking beam 44 illustrated in FIG. 5. Referring to FIG. 5, strain gauge or weight sensor 92, shown in phantom, is positioned in a cavity 65 located in a top surface 45 of walking beam 44. In the illustrated embodiment, sensor 92 and cavity 65 are positioned near a center portion of walking beam 44 and above shaft 46 for detecting the load on beam 44, although sensor 92 may be positioned in other suitable positions. A cover 67 is provided in cavity 65 to substantially enclose sensor 92 within cavity 65. In one embodiment, a seal is provided between cover 67 and the surface that forms cavity 65 to provide a sealed enclosure for sensor 92. A sensor cable 69 is configured to couple sensor 92 to controller 82 for providing feedback to controller 82. Sensor 92 is illustratively positioned substantially parallel to a longitudinal axis 49 of walking beam 44, although sensor 92 may also be positioned substantially perpendicular to axis 49 of walking beam 44. In one embodiment, sensor 92 includes one strain gauge mounted substantially parallel to axis 49 and another strain gauge mounted substantially perpendicular to axis 49. In one embodiment, sensor 92 is coupled to walking beam 44 with an adhesive.

By detecting the strain on beams 44 of wheel assemblies 36a, 36b, sensors 92 provide electrical signals indicative of the weight on each wheel assembly 36a, 36b to controller 82. Weight sensors 92 may be mounted at other locations suitable for measuring the weight on each wheel assembly 36a, 36b. Further, other suitable weight sensors may be provided for detecting the weight supported by wheel assemblies 36a, 36b.

When vehicle 10 is positioned on a slope, the payload detected at rear wheel assemblies 36a, 36b may not be representative of the actual payload. With vehicle 10 positioned down a slope with front wheel assembly 32 lower than rear wheel assembly 33, vehicle 10 may experience a weight transfer toward the front of the vehicle 10, and the detected payload weight may be less than the actual payload weight. Similarly, with vehicle 10 positioned up a slope with front wheel assembly 32 higher than rear wheel assembly 33, vehicle 10 may experience a weight transfer toward the back of the vehicle 10, and the detected payload weight may be more than the actual payload weight. To reduce the likelihood of a weight calculation error, controller 82 is configured to adjust the detected payload weight based on the detected slope or inclination angle. For example, controller 82 may calculate the actual payload weight based on the weight detected at rear wheel assemblies 36a, 36b with weight sensors 92 and the ground slope angle detected with slope sensor 86.

In one embodiment, one or more weight sensors 92 may be coupled to front wheel assembly 32 for measuring weight supported by front wheel assembly 32. For example, two weight sensors 92 may be coupled to front axle 54 for measuring the load on the left and right portions of front axle 54 of front wheel assembly 32. In one embodiment, based on the input from weight sensors 92, vehicle controller 82 may compare the measured weights on rear wheel assemblies 36a, 36b and front wheel assembly 32 to determine the weight distribution of vehicle 10. The weight supported by front wheel assembly 32 may also be determined by measuring the height of a strut assembly at each of the left and right wheels 34a, 34b. Based on the measured strut height, controller 76 may determine the weight of vehicle 10 on wheel 34a, 34b.

Braking system 80 includes one or more speed retarders 120 for slowing or braking vehicle 10, as shown in FIG. 3. A transmission retarder 122 is configured to slow the rotational speed of transmission 51 and other drive train components under certain vehicle operating conditions, as described herein. In the illustrated embodiment, transmission retarder 122 is a hydraulic or hydrodynamic retarder, although other types of retarders may be used. In one embodiment, transmission retarder 122 includes a plurality of vanes coupled to shaft 98 of transmission 51 and contained within a chamber of transmission retarder 122. Oil or other suitable fluid introduced into the chamber of transmission retarder 122 may interact with the moving vanes to absorb the energy of drive shaft 56 and to slow vehicle 10. In one embodiment, transmission retarder 122 is configured to slow vehicle 10 or to maintain a steady vehicle speed as vehicle 10 travels down an incline.

In one embodiment, speed retarders 120 may further include an exhaust brake 124 and/or an engine brake 126 to facilitate speed reduction of vehicle 10. For example, exhaust brake 124 may include a valve, such as a butterfly valve, mounted in the exhaust of vehicle 10 for restricting airflow and slowing engine 31. Engine brake 126 may include an engine valve brake configured to increase compression in engine 31 to slow engine 31. The position of the valves of exhaust brake 124 and engine brake 126 may be controlled based on the operating conditions of vehicle 10. In the illustrated embodiment, controller 82 is configured to control speed retarders 120, although other controllers may be used. In one embodiment, vehicle 10 may further include an electromagnetic retarder coupled to an axle 54, 58, 60, drive shaft 56, transmission output shaft 98, or other rotating drive line component and configured to reduce the speed of engine 31 and transmission 51.

In the illustrated embodiment, retarders 120 are manually enabled. As illustrated in FIG. 3, vehicle 10 includes a retarder switch 130 in communication with controller 82 configured to allow an operator to enable retarders 120. Alternatively, retarders 120 may be automatically enabled by controller 82. Once enabled, speed retarders 120 are configured to activate automatically based on the operating conditions of vehicle 10. In the illustrated embodiment, enablement of retarders 120 allows retarders 120 to be activated, and activation of retarders 120 causes retarders 120 to apply a braking force to vehicle 10. In one embodiment, once enabled, one or more retarders 120 automatically activate upon the release of accelerator 101 by an operator. For example, controller 82 may activate at least one of retarders 120 to slow vehicle 10 when an operator removes application of a force to accelerator 101 (i.e., accelerator 101 returns to a "home" position). In one embodiment, all retarders 120 are activated upon release of accelerator 101 or upon accelerator 101 returning to a home position. Alternatively, other vehicle conditions may trigger activation of retarders 120, such as actuation of brake input device 100 by an operator, for example.

In the illustrated embodiment, the strength of retarders 120 may be set manually by an operator with switch 130 or another input device. Switch 130 allows an operator to select between different settings of one or more of retarders 120. For example, switch 130 may allow an operator to adjust the strength or gain of transmission retarder 122. A higher gain setting of retarders 120 results in a greater braking force exerted by retarders 120. In one embodiment, retarders 124 and 126 have an on/off configuration and do not include a variable strength setting. In one embodiment, switch 130 is provided on a control panel or operator interface in cab portion 12.

Switch 130 may include a plurality of positions, each position corresponding to a different strength or gain of one or more retarders 120. For example, transmission retarder 122 may be configured to provide a small braking force on drive shaft 56 in a first position of switch 130 and a large braking force on drive shaft 56 in a second position of switch 130. An operator may set the strength of retarders 120 based on the load conditions of vehicle 10. For example, when vehicle 10 is in a laden state (i.e., vehicle 10 is carrying a payload), an operator may set transmission retarder 122 to full capacity or strength. When vehicle 10 is in an unladen state (i.e., vehicle 10 is not carrying a payload or is carrying a minimal payload), an operator may set transmission retarder 122 at a partial capacity or strength. In one embodiment, the strength of retarders 120 may be adjusted to several discrete strength levels to accommodate different payloads carried by vehicle 10. In one embodiment, controller 82 is configured to monitor the payload of vehicle 10 with weight sensors 92 and to automatically increase the strength of retarders 120 upon detecting an increased vehicle payload and to automatically decrease the strength of retarders 120 upon detecting a decreased vehicle payload. In one embodiment, controller 82 adjusts retarders 120 proportionally to the detected payload of vehicle 10 or at various discrete strength levels.

In the illustrated embodiment, controller 82 is configured to adjust the strength of one or more retarders 120 during a modulation or shift of transmission 51 based on the load condition and inclination of vehicle 10, as described herein. In particular, controller 82 is configured to improve the shift quality of transmission 51 by providing an input to transmission controller 116 configured to facilitate a smoother downhill descent of vehicle 10 as transmission 51 shifts between gears. In the illustrated embodiment, controller 82 may adjust the strength of retarders 120 prior to or during an upshift or a downshift of transmission 51.

In the illustrated embodiment, transmission 51 is configured to downshift automatically as vehicle 10 descends a downhill slope, thereby providing additional braking capacity to vehicle 10 to reduce the likelihood of vehicle 10 accelerating rapidly down the slope. In one embodiment, transmission controller 116 instructs transmission 51 to downshift based on the detected vehicle speed and the position of accelerator 101. In particular, when the detected vehicle speed is faster than a demanded speed corresponding to the position of accelerator 101, or when vehicle 10 is accelerating at a faster rate than demanded by the position of accelerator 101, transmission 51 may downshift to slow vehicle 10. Automatic downshift of transmission 51 may also be based on the detected inclination angle of vehicle 10 with slope sensor 86. In the illustrated embodiment, vehicle controller 82 provides a control signal to transmission controller 116 to downshift transmission 51 upon detection of the appropriate vehicle conditions.

In one embodiment, transmission 51 also automatically upshifts in certain operating conditions. For example, as transmission 51 approaches a maximum speed in a particular gear and an operator demands continued acceleration or speed with accelerator 101, transmission 51 may automatically upshift to provide additional speed capability. Such a condition may occur when vehicle 10 is traveling on substantially level ground or is descending a downhill at a slower speed than demanded, for example, although transmission 51 may automatically upshift during other suitable operating conditions. An upshift of transmission 51 may result in a decrease in the effective braking force to drive train 48 due to the reduced braking effect provided with transmission 51.

The combination of the automatic downshift of transmission 51 and the automatic application of retarders 120 may result in a sudden deceleration of vehicle 10 or a harsh transmission shift as vehicle descends a slope. For example, with retarders 120 set at a high strength or gain, the additional braking force applied to vehicle 10 resulting from an automatic downshift of transmission 51 may cause a sudden or harsh deceleration of vehicle 10. As such, controller 82 may reduce the strength of retarders 120 during or prior to a downshift of transmission 51 to provide a smoother transition between transmission gears when retarders 120 are at a high gain setting.

In addition, controller 82 may adjust the strength of retarders 120 based on the load weight of vehicle 10. For example, if retarders 120 are at a high gain setting and the detected load is minimal, controller 82 may automatically reduce the strength of retarders 120 prior to the downshift of transmission 51 to reduce the likelihood of over-braking vehicle 10 and causing a harsh deceleration.

Similarly, with retarders 120 set at a low gain setting, the additional braking force applied to vehicle 10 resulting from an automatic downshift of transmission 51 may be inadequate to slow vehicle 10 properly or to keep vehicle 10 below a maximum downhill speed. Further, if retarders 120 are at a low gain setting appropriate for a small load, and the actual detected load is large, the inadequacy of the combined braking force may be amplified. As such, controller 82 may automatically increase the strength of retarders 120 under such conditions to provide additional braking capacity to vehicle 10 during a downshift of transmission 51.

The combination of the automatic upshift of transmission 51 and the automatic application of retarders 120 may result in a sudden acceleration of vehicle 10 or a harsh transmission shift. For example, with retarders 120 set at a low strength or gain, the reduced braking force applied to vehicle 10 resulting from an automatic upshift of transmission 51 may cause a sudden or harsh acceleration of vehicle 10. As such, controller 82 may increase the strength of retarders 120 during or prior to an upshift of transmission 51 to provide a smoother transition between transmission gears and to reduce the likelihood of a sudden acceleration when retarders 120 are at a low gain setting.

In addition, controller 82 may adjust the strength of retarders 120 based on the load weight of vehicle 10. For example, if retarders 120 are at a low gain setting and the detected load is large, controller 82 may automatically increase the strength of retarders 120 prior to the upshift of transmission 51 to reduce the likelihood of vehicle 10 over-speeding or experiencing an sudden acceleration.

Similarly, the braking force applied with transmission 51 after an automatic upshift of transmission 51 may be adequate to slow vehicle 10 properly or to keep vehicle 10 below a maximum downhill speed. If retarders 120 are at a high gain setting, vehicle 10 may experience a harsh deceleration upon upshifting transmission 51. As such, controller 82 may automatically decrease the strength of retarders 120 under such conditions to provide reduce the braking capacity to vehicle 10 during an upshift of transmission 51.

In one embodiment, the strength of retarder 120 is returned to the initial setting (i.e., the gain setting prior to the automatic transmission shift) upon vehicle 10 shifting back into the previous gear. For example, if the strength of retarder 120 was increased prior to the downshift of transmission 51, the strength setting of retarder 120 may be automatically increased upon vehicle 10 no longer requiring downhill braking or upon transmission 51 shifting back into the higher gear.

In one embodiment, braking system 80 may further include a sensor, such as an accelerometer, configured to detect a sudden acceleration or "shift shock" of vehicle 10. A sudden acceleration of vehicle 10 may be the result of a harsh deceleration or acceleration of vehicle 10 upon transmission 51 shifting between gears. As such, controller 82 could further identify poor shift quality based on the input from the accelerometer and adjust the strength of one or more retarders 120 accordingly.

Figure 4:
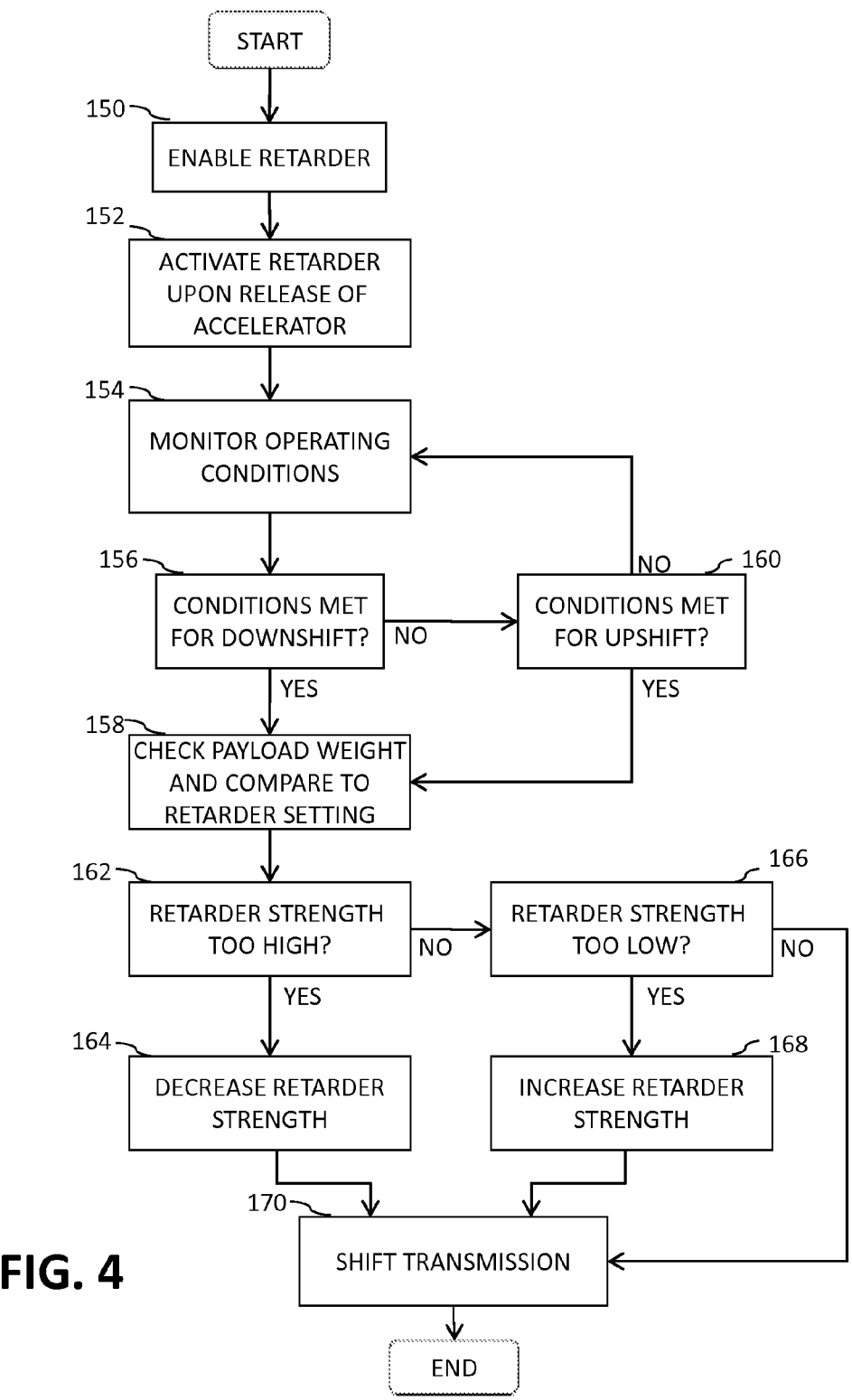
FIG. 4 illustrates an exemplary retarder modulation method for the vehicle of FIG. 1.

Referring to FIG. 4, an exemplary automatic modulation method for retarders 120 is illustrated. While the following discusses the method of FIG. 4 with reference to transmission retarder 122, the method of FIG. 4 may apply to any combination of retarders 120. At block 150, transmission retarder 122 is enabled. As described herein, transmission retarder 122 is enabled by controller 82 upon actuation of switch 130, although transmission retarder 122 may alternatively be enabled automatically by controller 82 under certain operating conditions. The strength of transmission retarder 122 may also be set at block 150. At block 152, controller 82 activates transmission retarder 122 based on the vehicle operating conditions. In the illustrated embodiment, controller 82 activates transmission retarder 122 upon detection of the release of accelerator 101, as described herein.

As represented by block 154, controller 82 and/or transmission controller 116 monitors the operating conditions of vehicle 10 to control the shifting of transmission 51. In one embodiment, controller 82 may monitor the vehicle speed and the position of accelerator 101 to control transmission 51, as described herein. If the vehicle conditions are met for an automatic downshift of transmission 51 at block 156 or for an automatic upshift of transmission 51 at block 160, controller 82 checks the detected vehicle payload, as represented at block 158. In the illustrated embodiment, controller 82 calculates the actual vehicle payload based on the weight detected with weight sensors 92 and the inclination angle detected with slope sensor 86 and compares the payload weight to the gain setting of transmission retarder 122, as described herein. If the strength of retarder 122 is determined to be too high, controller 82 decreases the strength setting of retarder 122 prior to or during the shift of transmission 51, as represented by blocks 162, 164, and 170. Alternatively, if the strength of transmission retarder 122 is determined to be too low, controller 82 increases the strength setting of retarder 122 prior to or during the shift of transmission 51, as represented by blocks 166, 168, and 170.

As described herein, the strength of retarder 122 may be determined to be too high at block 162 if the combination of the braking force of transmission retarder 122 and the additional braking force resulting from the downshift of transmission 51 is likely to cause a harsh deceleration of vehicle 10. Further, as described herein, the strength of transmission retarder 122 may be determined to be too low at block 166 if controller 82 determines that an upshift of transmission 51 is likely to cause a sudden acceleration of vehicle 10. Other conditions may cause controller 82 to determine that the strength of retarder 122 is too high or too low at blocks 162 and 166, as described herein.

While braking system 80 is described herein with respect to articulated vehicle 10, braking system 80 may be implemented on other types of vehicles. For example, braking system 80 may be implemented in other work or utility vehicles such as a motor grader, a tractor, a bulldozer, a feller buncher, a crawler, an excavator, a skidder, or another utility vehicle. Similarly, braking system 80 may also be implemented in a commercial vehicle or other roadworthy motor vehicles.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this disclosure pertains and which fall within the limits of the appended claims.

The invention claimed is:

1. A vehicle including:
a chassis;
a front wheel assembly configured to support the chassis;
a rear wheel assembly configured to support the chassis;
a drive train including an engine, a transmission coupled to the engine, and a drive shaft coupled to the front and rear wheel assemblies, the transmission being configured to shift between a first gear and a second gear;
a retarder configured to apply a braking force to the drive train; and
a controller in communication with the retarder and the transmission, the controller being configured to automatically adjust a gain of the retarder based on a shift of the transmission between the first gear and the second gear.

2. The vehicle of claim 1, wherein the retarder includes a transmission retarder configured to apply the braking force to the transmission.

3. A vehicle including:
a chassis;
a front wheel assembly configured to support the chassis;
a rear wheel assembly configured to support the chassis;
a drive train including an engine, a transmission coupled to the engine, and a drive shaft, the transmission being configured to shift between a plurality of gears;
a retarder configured to apply a braking force to the drive train;
a sensor configured to detect a load condition of the vehicle; and
a controller in communication with the retarder and the transmission, the controller being configured to detect a shift condition of the transmission, the controller being configured to adjust a strength of the retarder upon detection of the shift condition of the transmission and based on the detected load condition of the vehicle.

4. A vehicle including:
a chassis;
a drive train including an engine, a transmission coupled to the engine, and a drive shaft, the transmission being configured to shift between a plurality of gears;
an accelerator configured to adjust a speed of the vehicle;
a retarder coupled to the drive train and configured to apply a braking force to the drive train;
a modulation means for shifting the transmission between the plurality of gears;
a detection means for detecting a shifting condition of the transmission; and
an adjustment means for adjusting a strength of the retarder in response to detection of the shifting condition with the detection means and based on at least one of the speed of the vehicle, an inclination angle of the vehicle, and a position of the accelerator.

5. The vehicle of claim 4, wherein the retarder is configured to apply the braking force to at least one of the engine, the transmission, and the drive shaft.

6. The vehicle of claim 1, wherein the controller automatically adjusts the gain of the retarder at least one of prior to and during the shift of the transmission, and the controller is configured to reduce the gain of the retarder based on a downshift of the transmission and to increase the gain of the retarder based on an upshift of the transmission.

7. The vehicle of claim 1, further including a sensor configured to detect a load condition of the vehicle, the controller being configured to automatically adjust the gain of the retarder further based on the detected load condition of the vehicle.

8. The vehicle of claim 7, wherein the retarder includes a gain setting that is based on a theoretical load condition of the vehicle, and the controller is configured to adjust the gain of the retarder during the shift of the transmission based on the detected load condition being different from the theoretical load condition.

9. The vehicle of claim 1, further including a sensor configured to detect acceleration of the vehicle, the controller being configured to increase the gain of the retarder upon detection of an acceleration of the vehicle during the shift of the transmission and to decrease the gain of the retarder upon detection of a deceleration of the vehicle during the shift of the transmission.

10. The vehicle of claim 3, wherein the retarder includes a strength setting corresponding to a theoretical load condition of the vehicle, and the controller is configured to adjust the strength of the retarder based on the detected load condition being different from the theoretical load condition.

11. The vehicle of claim 10, the controller being configured to reduce the strength of the retarder based on a downshift of the transmission and the theoretical load condition being greater than the detected load condition.

12. The vehicle of claim 10, the controller being configured to increase the strength of the retarder based on a downshift of the transmission and the theoretical load condition being less than the detected load condition.

13. The vehicle of claim 10, the controller being configured to increase the strength of the retarder based on an upshift of the transmission and the theoretical load condition being less than the detected load condition.

14. The vehicle of claim 10, the controller being configured to reduce the strength of the retarder based on an upshift of the transmission and the theoretical load condition being greater than the detected load condition.

15. The vehicle of claim 4, wherein the modulation means includes a transmission controller configured to shift the transmission between the plurality of gears.

16. The vehicle of claim 4, wherein the detection means and the adjustment means includes a controller in communication with the transmission and the retarder.

17. The vehicle of claim 16, further including a load sensor configured to detect a load condition of the vehicle, the controller being configured to adjust the strength of the retarder upon detection of the shifting condition and based on the detected load condition of the vehicle.

18. The vehicle of claim 5, wherein the retarder includes at least one of a hydrodynamic retarder, an electromagnetic retarder, an exhaust brake, and an engine brake.

19. A method of braking a vehicle, the method including the steps of:
providing a vehicle including a chassis, a drive train, and a retarder configured to apply a braking force to the drive train, the drive train including an engine, a transmission, and a drive shaft;
detecting a load condition of the vehicle;
modulating the transmission between an initial gear and a subsequent gear; and
adjusting a strength of the retarder based on the modulating step and the detected load condition of the vehicle.

20. The method of claim 19, wherein the retarder includes a strength setting that is based on a theoretical load condition of the vehicle, further including the step of comparing the detected load condition of the vehicle with the strength setting of the retarder, the adjusting step being further based on the comparing step.

21. The method of claim 20, wherein the strength of the retarder is increased upon the detected load condition of the vehicle being greater than the theoretical load condition corresponding to the strength setting of the retarder and is decreased upon the detected load condition of the vehicle being less than the theoretical load condition corresponding to the strength setting of the retarder.

22. The method of claim 19, wherein the adjusting step includes increasing the strength of the retarder based on an upshift of the transmission and decreasing the strength of the retarder based on a downshift of the transmission.

23. The method of claim 19, wherein the adjusting step is performed simultaneously with the modulating step.

24. The method of claim 19, further providing a sensor configured to detect acceleration of the vehicle, the strength of the retarder being increased upon detection of an acceleration of the vehicle during the modulating step and being decreased upon detection of a deceleration of the vehicle during the modulating step.

25. The method of claim 19, the vehicle further including an accelerator configured to adjust a speed of the vehicle, the modulating step being based on at least one of the vehicle speed, an inclination angle of the vehicle, and a position of the accelerator.

26. The method of claim 25, further including the step of activating the retarder upon the accelerator moving to a predetermined position.

27. The vehicle of claim 17, wherein the vehicle includes an operator input device in communication with the controller for adjusting an initial strength setting of the retarder, and the controller is configured to adjust the strength of the retarder from the initial strength setting in response to the detection of the shifting condition based on a comparison of the detected load condition to the initial strength setting of the retarder.

28. A vehicle including:
a chassis;
a drive train including an engine, a transmission coupled to the engine, and a drive shaft, the transmission being configured to shift between a plurality of gears;
an accelerator configured to adjust a speed of the vehicle;
a retarder coupled to the drive train and configured to apply a braking force to the drive train;
a modulator configured to shift the transmission between the plurality of gears;
a detector configured to detect a shifting condition of the transmission; and
an adjustor configured to adjusting a strength of the retarder in response to detection of the shifting condition with the detector and based on at least one of the speed of the vehicle, an inclination angle of the vehicle, and a position of the accelerator.

\* \* \* \* \*

UNITED STATES PATENT AND TRADEMARK OFFICE
CERTIFICATE OF CORRECTION

| | | |
|---|---|---|
| PATENT NO. | : 8,708,072 B2 | Page 1 of 1 |
| APPLICATION NO. | : 13/028114 | |
| DATED | : April 29, 2014 | |
| INVENTOR(S) | : Joseph M. Denis Montocchio et al. | |

It is certified that error appears in the above-identified patent and that said Letters Patent is hereby corrected as shown below:

Title Page, item (75), in the inventor list, the address of John M. Chesterman is corrected to Dubuque, IA.

Signed and Sealed this
Sixth Day of January, 2015

Michelle K. Lee
*Deputy Director of the United States Patent and Trademark Office*